United States Patent
Beaudry et al.

(10) Patent No.: US 8,464,804 B2
(45) Date of Patent: Jun. 18, 2013

(54) ROBOT FOR MACHINING A PART OF STRUCTURE UNDER WATER

(75) Inventors: Julien Beaudry, Châteauguay (CA); Pierre-Luc Richard, Boucherville (CA); Dominique Thuot, Lachine (CA); Philippe Hamelin, Saint-Jean-sur-Richelieu (CA); Michel Blain, Saint-Amable (CA)

(73) Assignee: Hydro-Quebec, Montreal, Quebec (CA)

( * ) Notice: Subject to any disclaimer, the term of this patent is extended or adjusted under 35 U.S.C. 154(b) by 364 days.

(21) Appl. No.: 12/932,465

(22) Filed: Feb. 25, 2011

(65) Prior Publication Data

US 2011/0203823 A1     Aug. 25, 2011

(51) Int. Cl.
*G21C 19/00*     (2006.01)

(52) U.S. Cl.
USPC .............. 173/1; 173/32; 173/152; 376/245; 376/260; 219/121.63; 219/121.67; 408/67; 408/88; 451/41; 451/439

(58) Field of Classification Search
USPC ......... 173/1, 31, 32, 34, 37, 152; 219/121.63, 219/121.67, 121.84; 408/67, 88, 97, 204, 408/77, 234; 451/41, 58, 439; 29/26 B, 824, 29/402.06; 376/245, 260, 258, 261
See application file for complete search history.

(56) References Cited

U.S. PATENT DOCUMENTS

| | | | | |
|---|---|---|---|---|
| 3,513,517 A | * | 5/1970 | Galbarini et al. | 29/26 R |
| 4,318,391 A | * | 3/1982 | Wachs et al. | 125/14 |
| 4,329,094 A | * | 5/1982 | Cooley et al. | 408/77 |
| 4,552,594 A | * | 11/1985 | van Voskuilen et al. | 134/34 |
| 4,716,010 A | * | 12/1987 | Gallo et al. | 376/260 |
| 4,724,636 A | * | 2/1988 | Tolino | 451/124 |
| 5,243,631 A | * | 9/1993 | Cearley et al. | 376/260 |
| 5,377,238 A | | 12/1994 | Gebelin et al. | |
| 5,633,902 A | * | 5/1997 | Moscardini et al. | 376/260 |
| 6,219,399 B1 | * | 4/2001 | Naruse et al. | 376/245 |
| 6,309,147 B1 | | 10/2001 | Matsumoto et al. | |
| 6,555,779 B1 | | 4/2003 | Obana et al. | |
| 6,610,992 B1 | * | 8/2003 | Macaulay et al. | 250/559.22 |
| 7,769,123 B2 | * | 8/2010 | Rowell et al. | 376/249 |
| 2010/0238269 A1 | | 9/2010 | Mirallès et al. | |

FOREIGN PATENT DOCUMENTS

| | | |
|---|---|---|
| JP | 2005-297090 A | 10/2005 |
| WO | WO 86/06696 | 11/1986 |
| WO | WO 2009/046519 A1 | 4/2009 |

* cited by examiner

*Primary Examiner* — Scott A. Smith
(74) *Attorney, Agent, or Firm* — Muirhead and Saturnelli, LLC (57) ABSTRACT

A robot for machining a part of structure under water, comprising a machine tool having a chamber receiving a machining element, a support and guiding structure of the machine tool fixable with respect to the part to be machined and having submersible mobile elements and corresponding submersible guiding elements defining axes along which the mobile elements are movable to position the machine tool with respect to the part to be machined, displacement units for displacement of the mobile elements along the axes, a gas supply connecting to the machine tool to inject gas in the chamber, and a programmable control unit for operating the displacement units and the machine tool based on a closed-loop control mode in order to achieve the machining of the part.

17 Claims, 12 Drawing Sheets

ROBOT FOR MACHINING A PART OF STRUCTURE UNDER WATER

FIELD OF THE INVENTION

The invention generally relates to the machining of a part of structure under water, and more particularly to a robot for machining a part of structure under water, like one of the embedded parts present in hydroelectric structures, in particular runways, sill or lintel of a sluice used to receive gates and stop logs.

BACKGROUND

The runways, sill or lintel of a sluice used to receive a gate or stop logs in a hydroelectric structure are parts prone to wear as time passes and thus requiring reconditioning works. The traditional reconditioning methods are based on minor repair tasks that may be completed under water by experimented divers and also on major works that require a preliminary drying of the work area. The automated reconditioning exhibits economical advantages, but raises serious problems due to the design of the submersible systems comprising various electromechanical parts. Other problems arise to both ensure automated and remotely operated tasks in an underwater environment, where the human presence is considered dangerous and where the availability of vision and internal sensors is limited. The underwater environment is also a source of important perturbations that may affect the operation of manipulators. The machining process is also affected by the underwater environment and poses precision problems.

Some apparatuses allowing performing reconditioning works under water have already been proposed.

For example, U.S. Pat. No. 6,309,147 (Matsumoto et al.) shows a remotely operated tool for drilling a plate in a nuclear reactor vessel. The tool has a drill bit moving along its rotation axis inside a stationary sleeve. The tool is mounted over the plate to be drilled, and a system is provided for collecting the chips resulting from the drilling. The drilling requires that the tool be still and properly fixed with respect to the plate to be drilled, and thus has no lateral or transverse mobility for its displacement, nor vertical other than that relative to the drill bit as required for the drilling. Furthermore, the tool is only provided with a basic controller limited to the operation of the motors of the tool and not designed to have automation capabilities for the drilling task, and even less for other tasks.

U.S. Pat. No. 6,555,779 (Obana et al.) proposes an apparatus that prevents water from entering in a bell covering and sliding on a workpiece, for example for welding or cutting. The apparatus has a pressurized water or gas injection system intended to form a water or gas curtain around the periphery of the bell to prevent water from entering. The apparatus is especially designed for performing a welding task along a line and can be mounted on a track by means of an assembly subjected to no important stresses and having a consequent construction. The control of the welding task is achieved by remote control operations from a worker, or by an automated mechanism reacting to image data captured with a camera during the welding.

U.S. Pat. No. 5,377,238 (Gebelin et al.) proposes a device for cutting or grinding a support of a nuclear reactor fuel assembly. The configuration of the device is specifically adapted to the prismatic geometry of the fuel assembly, and thus has a platform horizontally fastening to a support of the fuel assembly, a mobile carriage mounted on the platform, a hoist for hoisting the assembly, clamping elements for immobilizing the assembly, a table mounted on the carriage with a return element, a tool support mounted on the table, and a tool secured to the tool support.

JP application 2005297090 (Sato et al.) proposes a device for underwater polishing of a workpiece and collecting chips without however requiring a suction pump. The device comprises impellers disposed on the rotation shaft of the tool located in a bell so as to produce a negative pressure in the bell for draining the chips and water towards a filter that collects the chips. The construction of the device only allows light polishing or grinding works In general, the prior art apparatuses and devices have automation, mobility, robustness, precision and/or adaptation capabilities limited to such an extent that they are not adapted to the automation and achievement of machining works under water involving important stresses at the level of the machine tool, as for the grinding of embedded parts of hydroelectric structures.

SUMMARY

An object of the present invention is to provide a robot for machining a part of structure under water, like one of the embedded parts present in hydroelectric structures, in particular runways, sill or lintel of a sluice used for receiving gates and stop logs.

Another object of the present invention is to provide such a robot which is capable of performing tasks including machining and in particular grinding of parts of structures of various lengths.

Another object of the present invention is to provide such a robot which allows performing a machining task in an automated way with precision.

Another object of the present invention is to provide such a robot which has a support and guiding structure of the machine tool, the elements of which have a rigidity resisting to stresses produced by the machine tool, allowing advantageously using the robot for performing large-scale machining works.

According to an aspect of the invention, there is provided a robot for machining a part of structure under water, comprising:

a machine tool having a submersible motor, a machining element coupled to the motor, a chamber receiving a driven portion of the machining element, and at least one gas inlet communicating with the chamber;

a support and guiding structure for the machine tool, fixable with respect to the part to be machined and having submersible mobile elements and corresponding submersible guiding elements defining axes along which the mobile elements are movable for positioning the machine tool with respect to the part to be machined, the machine tool being attached to one of the mobile elements within reach of the part to be machined when the support and guiding structure is fixed with respect to the part to be machined, the mobile elements and the guiding elements having a rigidity resisting to stresses produced by the machine tool when the machine tool is in operation;

displacement units for displacement of the mobile elements along the axes;

a gas supply connectable to the at least one gas inlet of the machine tool for injecting gas in the chamber; and a control unit connecting to the machine tool and to the displacement units, the control unit being programmable for operating the displacement units and the machine tool based on a closed-loop control mode in order to perform the machining of the part.

According to another aspect of the invention, there is provided a method for machining a part of structure under water with a machine tool having a submersible motor and a machining element coupled to the motor, comprising the steps of:

fixing a support and guiding structure for the machine tool with respect to the part to be machined, the support and guiding structure having submersible mobile elements and corresponding submersible guiding elements defining axes along which the mobile elements are movable, and displacement units for displacement of the mobile elements along the axes for positioning the machine tool with respect to the part to be machined, the machine tool being attached to one of the mobile elements within reach of the part to be machined when the support and guiding structure is fixed with respect to the part to be machined, the mobile elements and the guiding elements having a rigidity resisting to stresses produced by the machine tool when the machine tool is in operation;

providing the machine tool with a chamber receiving a driven portion of the machining element, and at least one gas inlet communicating with the chamber;

supplying the at least one gas inlet of the machine tool with gas for injecting gas in the chamber; and operating the displacement units and the machine tool based on a closed-loop control mode in order to perform the machining of the part.

BRIEF DESCRIPTION OF THE DRAWINGS

A detailed description of the preferred embodiments of the invention will be given hereinafter with reference to the following drawings.

DETAILED DESCRIPTION OF THE PREFERRED EMBODIMENTS

As used herein, the term "structure under water" comprises a structure that may be fully or partially immerged or submerged.

Figure 1:
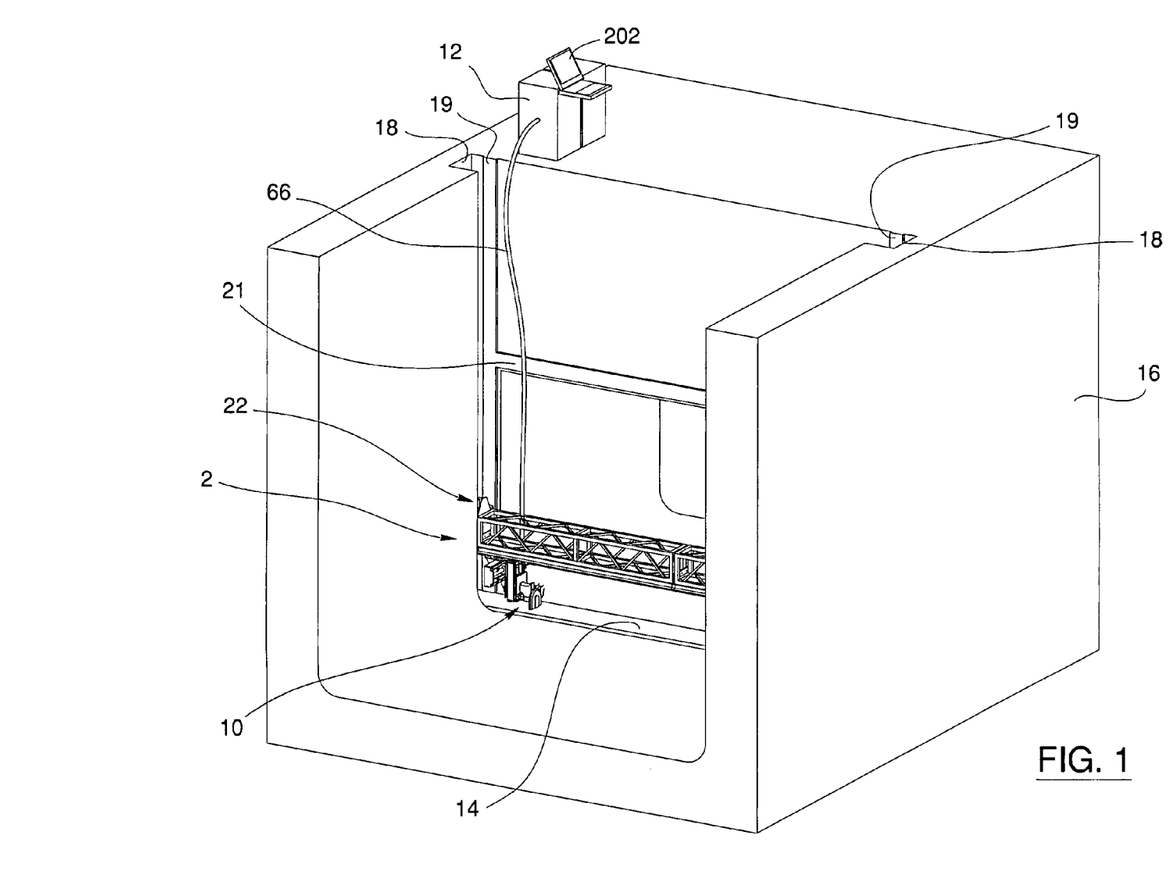
FIG. 1 is a schematic diagram of a robot for machining a part of structure under water according to the present invention, in position for reconditioning a dam gate sill.

Referring to FIG. 1, the robot according to the invention has a support and guiding structure 2 for a grinding tool 10 or another like tool for machining a part of structure under water such as a gate sill 14 of a hydroelectric structure 16. The support and guiding structure 2 may be lowered along two slots 18 near the runways 19 of the gate of the structure 16 using a compound hoisting system such as a winch, a bridge crane, etc. (not shown) in order to position it at an appropriate distance from the sill 14 for the grinding and to orient it in parallel to the sill 14, horizontally. The support and guiding structure 2 is fixable with respect to the part to be machined 14 for example using attachments 22 (only one is visible in the Figure) that lock in the slots 18. The control of the robot is achieved from a control station 12.

Figure 2:
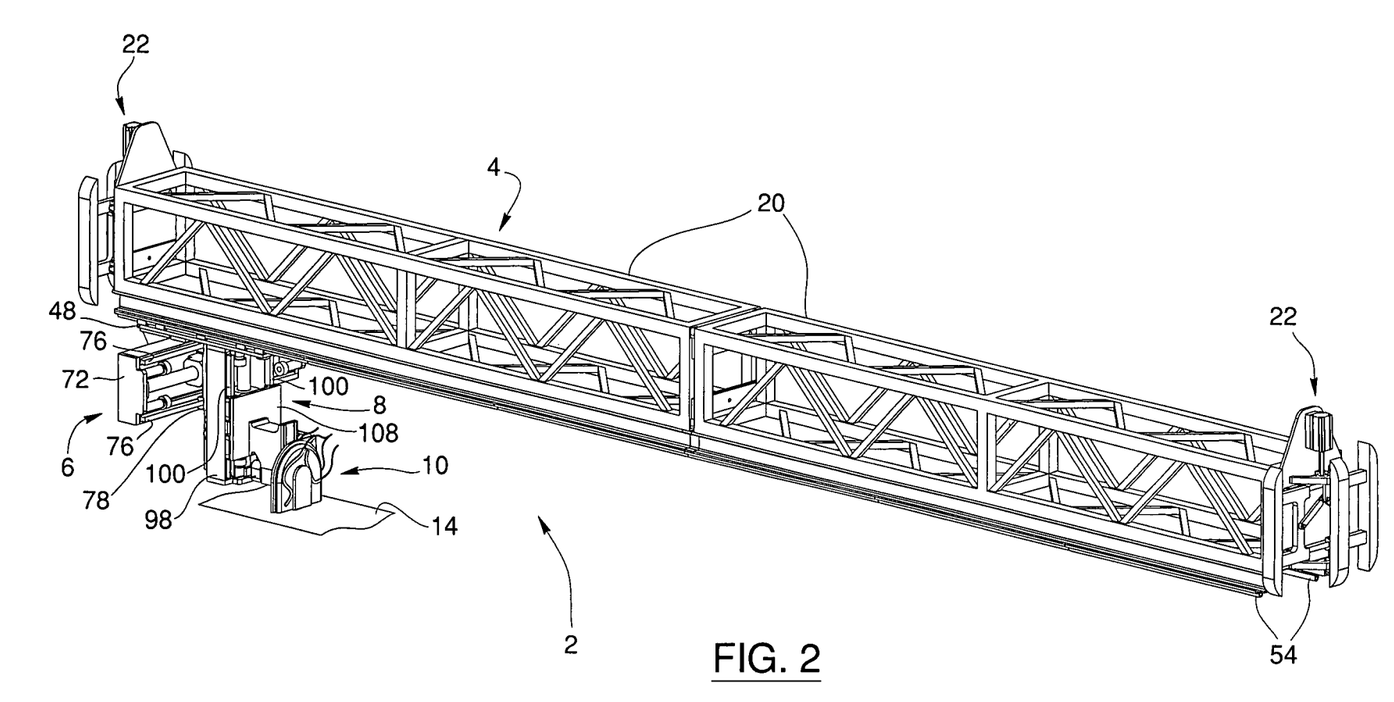
FIG. 2 is a schematic diagram of the robot with two longitudinal modules assembled to each other.

Referring to FIG. 2, the support and guiding structure 2 comprises longitudinal, transverse and vertical (or thrust) guiding modules 4, 6, 8. The guiding modules 4, 6, 8 have submersible mobile elements like the platforms 48, 78, 108 and the elements that are associated thereto, and corresponding submersible guiding elements like the pairs of tracks 54, 76, 100 and the elements that are associated thereto, defining axes along which the mobile elements are movable for positioning the grinding tool 10 with respect to the part to be machined 14. The grinding tool 10 is attached to the mobile element within reach of the part to be machined 14 when the support and guiding structure 2 is fixed with respect to the part to be machined 14. In the illustrated case, the grinding tool 10 is attached to the platform 108 forming the mobile element of the vertical guiding module 8.

The longitudinal guiding module 4 may be made of a number of longitudinal sub-modules 20 allowing adapting the length of the longitudinal guiding module 4 to the spacing between the structural elements such as the slots 18 of the gate of the structure 16 (illustrated in FIG. 1) between which the part to be machined 14 extends. The longitudinal sub-modules 20 assemble to one another, for example, using bolts and nuts (not shown). The longitudinal guiding module 4 thus has opposite ends configured to assemble to opposite ends of like modules used depending on whether the spacing between the structural elements requires more than one longitudinal sub-module 20. The opposite ends are also configured to be provided with attachments 22 projecting and engaging in the slots 18 of the gate of the structure 16 to lock the support and guiding structure 2 of the robot at the appropriate height for machining the sill 14 using the grinding tool 10.

A similar arrangement may be used for machining the lintel 21, by orienting the grinding tool 10 horizontally rather than vertically and by interchanging the role of the transverse and vertical guiding modules 6, 8. For machining the runways 19 near the slots 18, the robot is used in a configuration similar to that of the lintel 21 but the longitudinal guiding module 4 is then disposed vertically. The attachments 22 may then be configured to fix the longitudinal guiding module 4 at the bottom of one of the slots 18 and at the surface.

Figure 3:
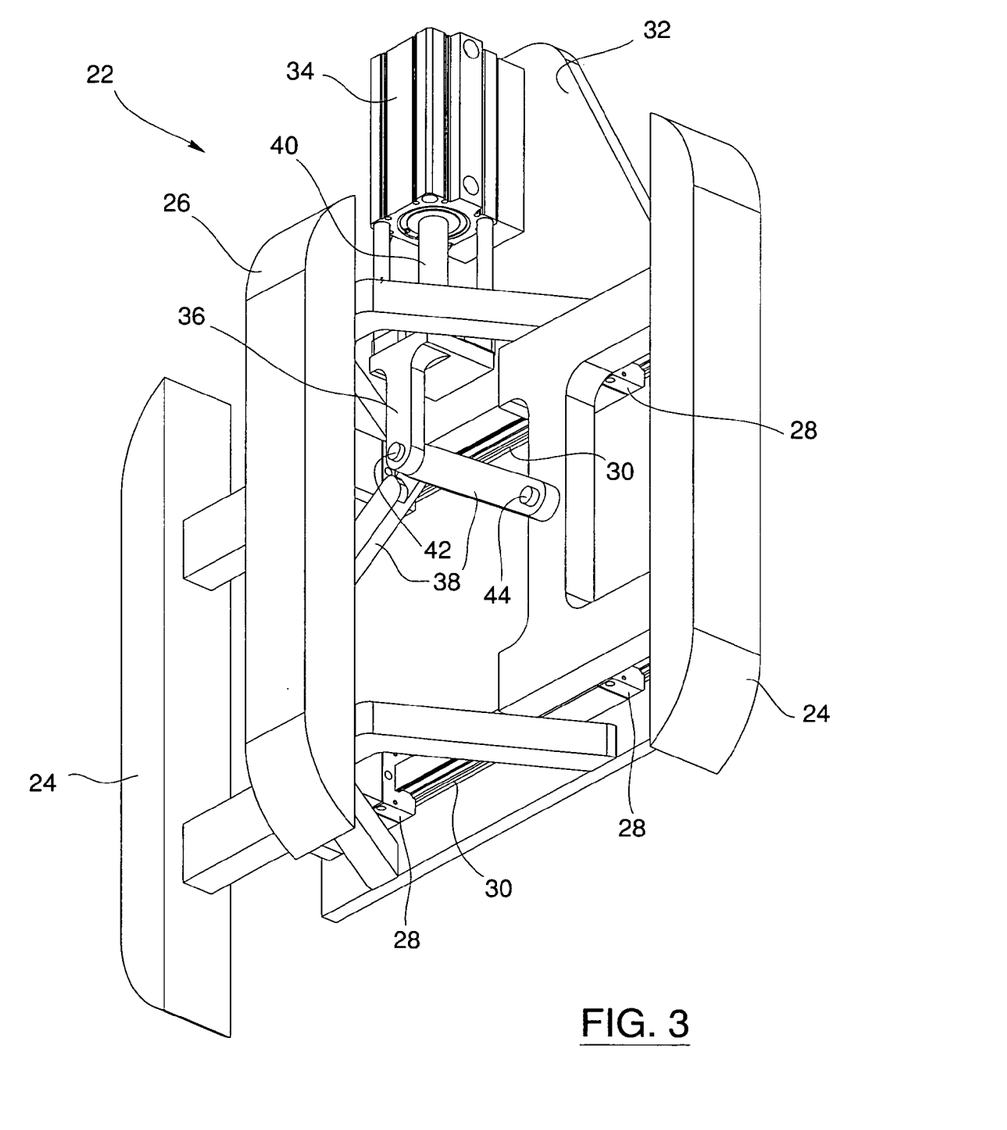
FIG. 3 is a perspective schematic diagram of a longitudinal module attachment.

Referring to FIG. 3, the attachment 22 may be made of an arrangement of two mobile locking shoes 24 and a guiding shoe 26. The locking shoes 24 project in opposite directions and are attached to submersible ball-bearing carriages 28 that slide along two submersible parallel tracks 30 ensuring an appropriate structural rigidity and disposed on a support plate 32 attaching to the ends of the longitudinal guiding module 4 (shown in FIG. 2). A pneumatic jack 34 attached to the support plate 32 has a piston 40 coupled to articulated rods 36, 38 connected to the shoes 24. The rod 36 moves along an axis perpendicular to the two tracks 30 in a parallel plane of these two tracks 30. One of the ends of each rod 38 is assembled to the rod 36 at the level of a rotation axis 42 while the other end is assembled to one of the shoes 24 at the level of a rotation axis 44. The jack 34 may thus be operated so that the articulated rods 36, 38 move the shoes 24 between extended and retracted positions in which, respectively, the shoes 24 engage against and disengage from the corresponding slots 18 (shown in FIG. 1).

In this configuration, a single pneumatic jack 34 allows moving simultaneously both locking shoes 24. Furthermore, if the rods 38 have a same length, the displacement of each shoe 24 is identical, just like the power transmitted to them by the pneumatic jack 34. The course of the pneumatic jack 34 and the length of the two rods 38 are such that they prevent the rods 38 from becoming parallel to the moving direction of the piston 40, which would hinder the displacement of the locking shoes 24 by the pneumatic jack 34. Furthermore, the movement of the piston 40 is arranged to prevent the rods 38 from being oriented in parallel to the tracks 30 in order to allow the force produced by the pneumatic jack 34 to be transmitted to the locking shoes 24 and to lock the support and guiding structure 2 of the robot in the slots 18.

The guiding shoe 26 facilitates the movement of the support and guiding structure 2 during its installation in the slots 18 and protects the other components of the attachment 22. The guiding shoe 26 is firmly attached to the support plate 32 and extends in parallel to the two locking shoes 24.

Figure 4:
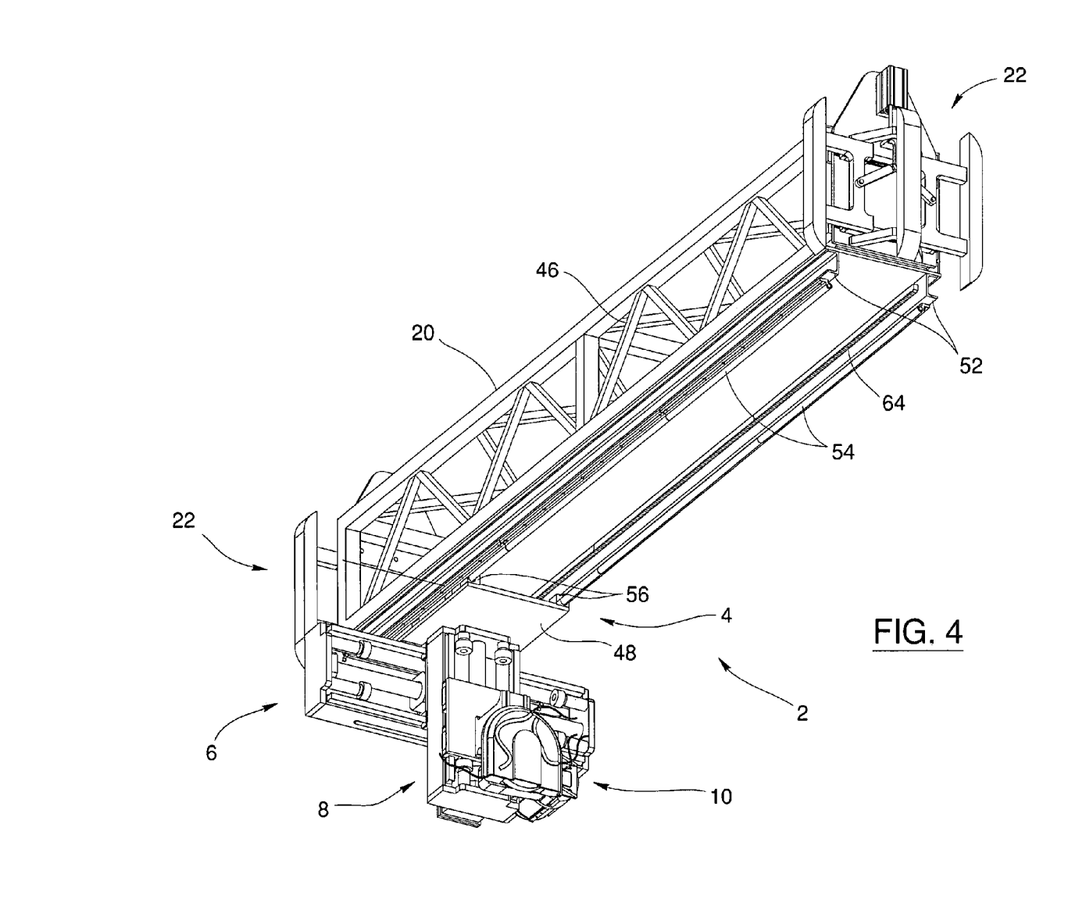
FIG. 4 is a schematic diagram of the machining robot with one longitudinal module.

Referring to FIG. 4, each longitudinal sub-module 20 is preferably made of an elongated support lattice 46, the triangulation of which contributes to maximize its rigidity. This allows increasing its resistance to vibrations, to minimize its deflection under the weight of the components supported by the mobile support platform 48 movable along the longitudinal guiding sub-module 20, and to resist to stresses induced by the grinding tasks. Each end of the support lattice 46 allows assembling, with bolts and nuts (not shown), either an attachment 22, or a similar support lattice 46, thus allowing the length of the support and guiding structure 2 of the robot to be adapted to the dimensions of the gate of the structure 16 (shown in FIG. 1). Furthermore, two support rails 52 are attached to the support lattice 46 in order to accurately install tracks 54 in parallel to each other and projecting along the lattice 46, allowing the mobile support platform 48 to slide on the tracks 54 using plain bearings 56 preferably of polymer, or other guiding elements like ball-bearing carriages (not shown).

Figure 5:
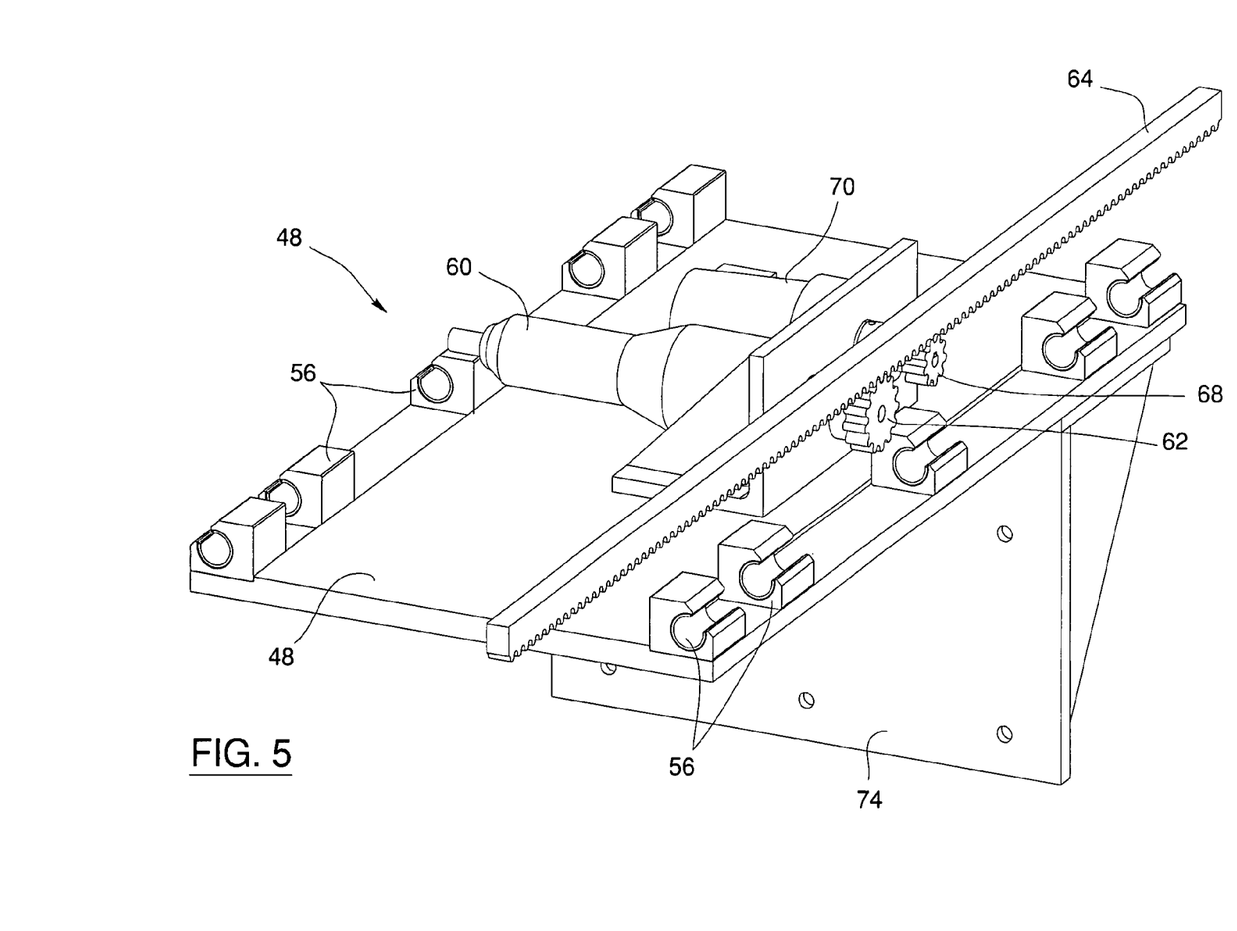
FIG. 5 is a perspective schematic diagram of a mobile support platform of the robot.

Referring to FIG. 5, there may be ten plain bearings 56 that are distributed on opposite sides of the mobile platform 48. The number may be different if desired, depending on the needs and for resisting to the weight of the components supported by the mobile support platform 48.

A submersible rotary motor 60, preferably DC, is mounted on the mobile platform 48 and forms a displacement unit for displacement of the mobile platform 48 along the axis defined by the tracks 54 (shown in FIG. 4). The rotary motor 60 is coupled to a pinion-rack system 62, 64 that allows the motor 60 to generate a driving force required for the longitudinal movement of the mobile support platform 48. The torque produced by the rotary motor 60 is transmitted by the power transmission pinion 62 to the rack 64 that is attached to the support rail 52. The rack 64 being stationary with respect to the support lattice 46, the mobile support platform 48 may thus move longitudinally along the tracks 54. The positions of the rack 64 and motor 60 may be inverted if desired, i.e. the rack 64 attached to the platform 48 and the motor 60 mounted on the lattice 46.

On the same mobile support platform 48 is an angular position encoder 70 mounted on pinion-rack 68, 64. A longitudinal movement along the tracks 54 (shown in FIG. 4) is then transformed by the rack 64 into a rotary movement of the reading pinion 68 and of the angular position encoder 70. The angular position provided by the encoder 70 may be converted into a linear position at the control station 12 (shown in FIG. 2) that transmits a control signal to a motor controller 188 (shown in FIG. 11) that controls the rotary motor 60 in power to control the mobile support platform 48 in position along the tracks 54. The rotary motor 60 and the angular position encoder 70 are connected to the control station 12 at the surface by submersible cables 66 (shown in FIG. 1).

Figure 6:
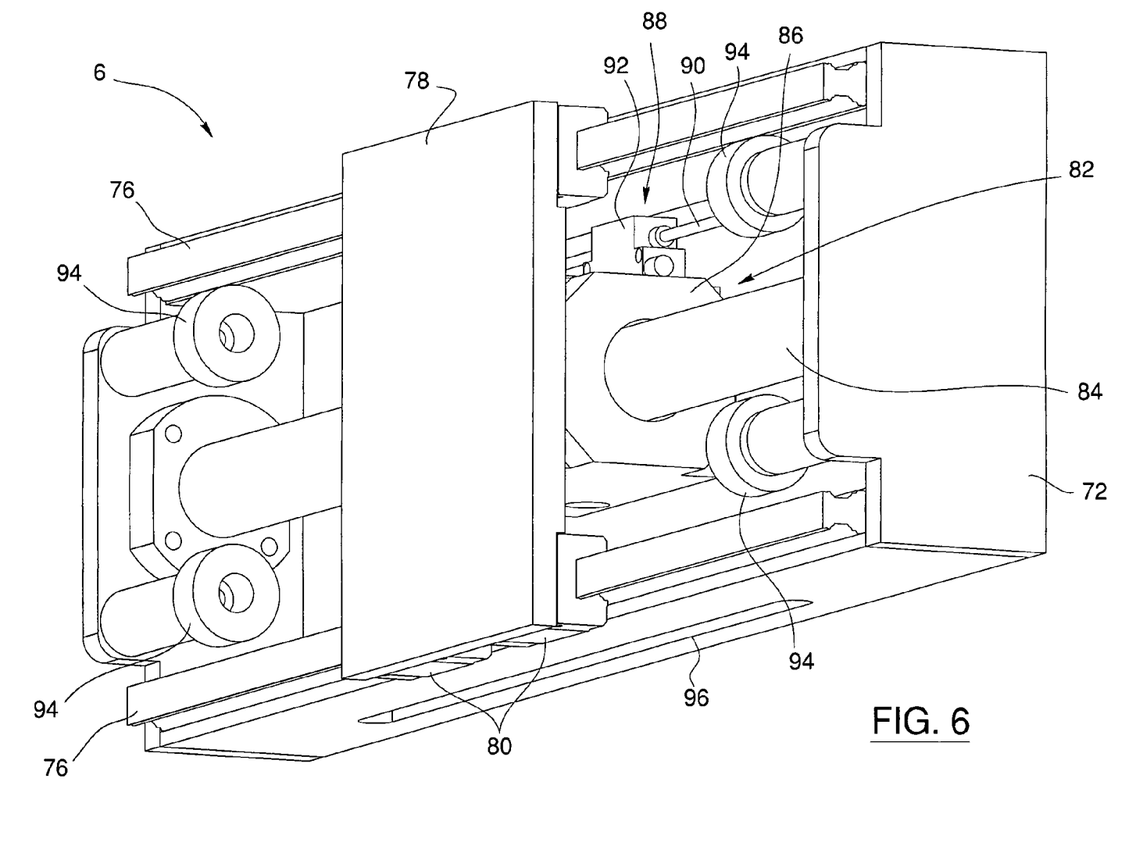
FIG. 6 is a perspective schematic diagram of a transverse guiding module.

Referring to FIG. 6, the transverse guiding module 6 has a support housing 72 that attaches to a plate 74 of the mobile support platform 48 (shown in FIG. 5) using, for example, bolts and nuts (not shown). Parallel submersible profiled tracks 76 projecting on opposite sides of the housing 72 allow moving a transverse mobile platform 78 through four submersible ball-bearing carriages 80 that ensure a good rigidity of the transverse guiding module 6.

A submersible linear motor 82 forms a displacement unit for displacement of the mobile platform 78 along the axis defined by the tracks 76. The magnetic shaft 84 with permanent magnets of the linear motor 82 is attached on the housing 72, while the coil 86 is attached to the transverse mobile platform 78 so that it is aligned with the magnetic shaft 84 (an inverted arrangement of the shaft 84 and the coil 86 may also be used if desired). A submersible linear encoder 88 allows reading the linear position of the transverse mobile platform 78 along the tracks 76. The rod 90 of the linear encoder 88 is installed on the housing 72 in parallel to the two tracks 76 and is disposed far enough from the magnetic shaft 84 in order to respect the electromagnetic susceptibility of the rod 90. The reading head 92 of the linear encoder 88 is coupled to the transverse mobile platform 78. Thus, the linear position of the transverse mobile platform 78 is read by the reading head 92 along the rod 90. The linear position is then controlled by the control station 12 (shown in FIG. 1) that sends a current in the coil 86 to create a force transmitted to the transverse mobile platform 78 in order to move it. The displacement of the transverse mobile platform 78 may be limited by four rubber stops 94 installed two by two at each one of the ends of the housing 72. A slot 96 on the support housing 72 facilitates the installation and the positioning of the electric cables (not shown) connecting the linear motor 82 and the linear encoder 88 to an electrical box 118 (shown in FIGS. 7 and 8).

Figure 7:
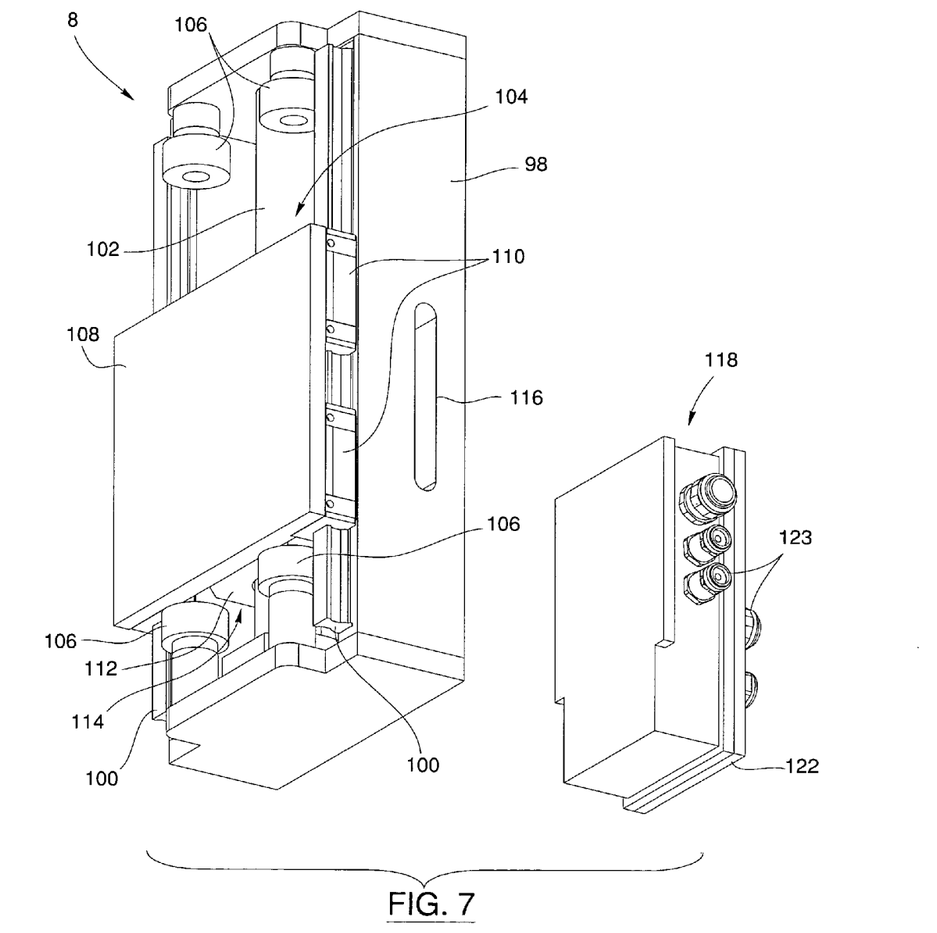
FIG. 7 is a perspective schematic diagram of a thrust guiding module and an electrical box of the robot.

Referring to FIG. 7, the vertical (or thrust) guiding module 8 is similar to the transverse guiding module 6 (shown in FIG. 6). The module 8 is made of a support housing 98 on which two submersible profiled tracks 100, a linear motor 104 having a magnetic shaft 102 with permanent magnets, a linear encoder rod (not shown) and four rubber stops 106 are attached. A thrust mobile platform 108 moves along the tracks 100 through four submersible ball-bearing carriages 110 disposed as those of the transverse guiding module 6. A coil 112 and an encoder head (not shown) are attached to the thrust mobile platform 108 and allow respectively creating a force on the thrust mobile platform 108 and reading its linear position along the tracks 100 and of the encoder rod. Furthermore, a slot 116 facilitates the displacement of the electric cables 66 (shown in FIG. 1). The thrust guiding module 8 may be attached on the transverse mobile platform 78 of the transverse mobile module 6 (shown in FIG. 6) through bolts and nuts, so that the displacement axis is perpendicular to the displacement axis defined by the transverse guiding module 6 and to the displacement axis defined by the longitudinal guiding module 4 (shown in FIG. 4).

An electrical box 118 allows achieving junctions between cables (not shown) connected to the various electrical components of the support and guiding structure 2 and the cables 66 (shown in FIG. 1) going up to the surface and connecting to the control station 12. The electrical box 118 may be attached on the housing 98 of the thrust guiding module 8 on the side opposite to the thrust mobile platform 108.

Figure 8:
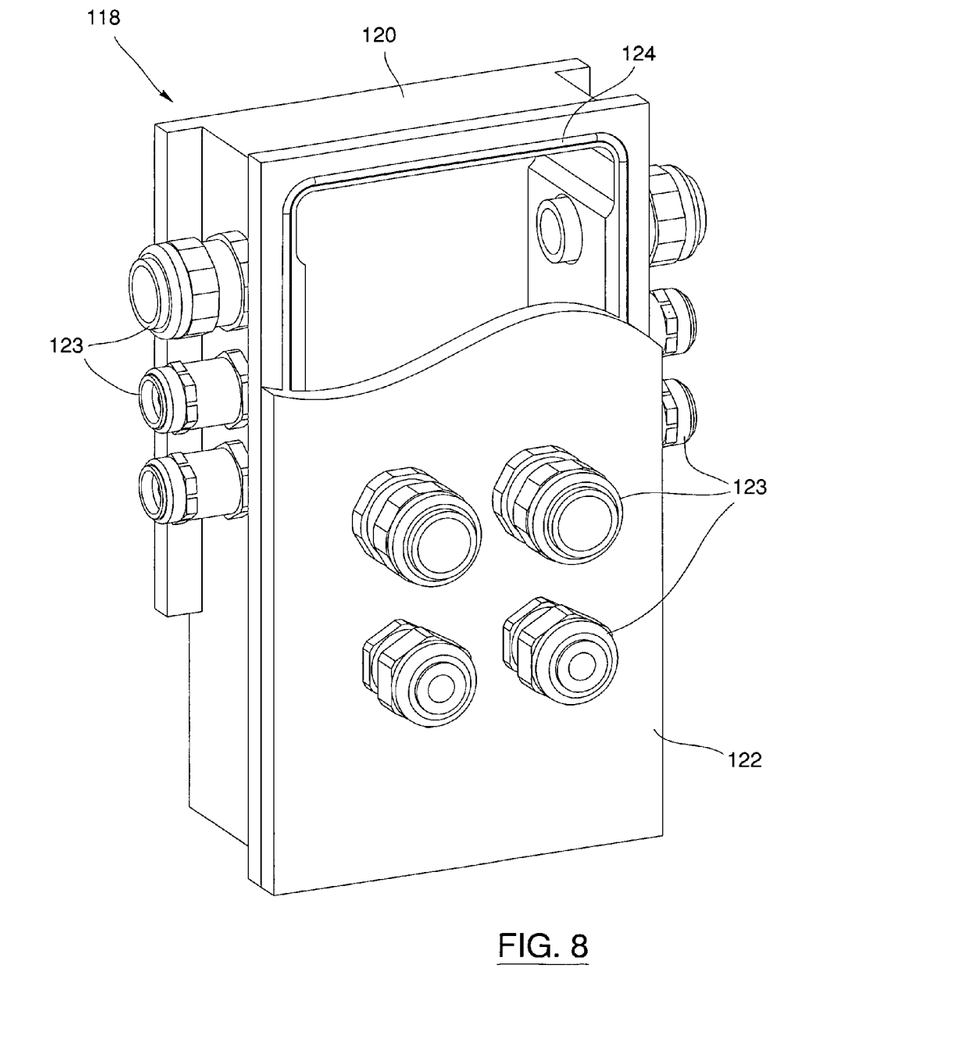
FIG. 8 is a perspective schematic diagram of the electrical box.

Referring to FIG. 8, the electrical box 118 has a housing 120 and a lid 122 through which the cables (not shown) may pass. The watertightness of the electrical box 118 is preferably ensured using a rubber O-ring 124 disposed between the housing 120 and the lid 122. The cables enter the electrical box 118 via wall-through type devices 123 also ensuring the watertightness.

Figure 9A:
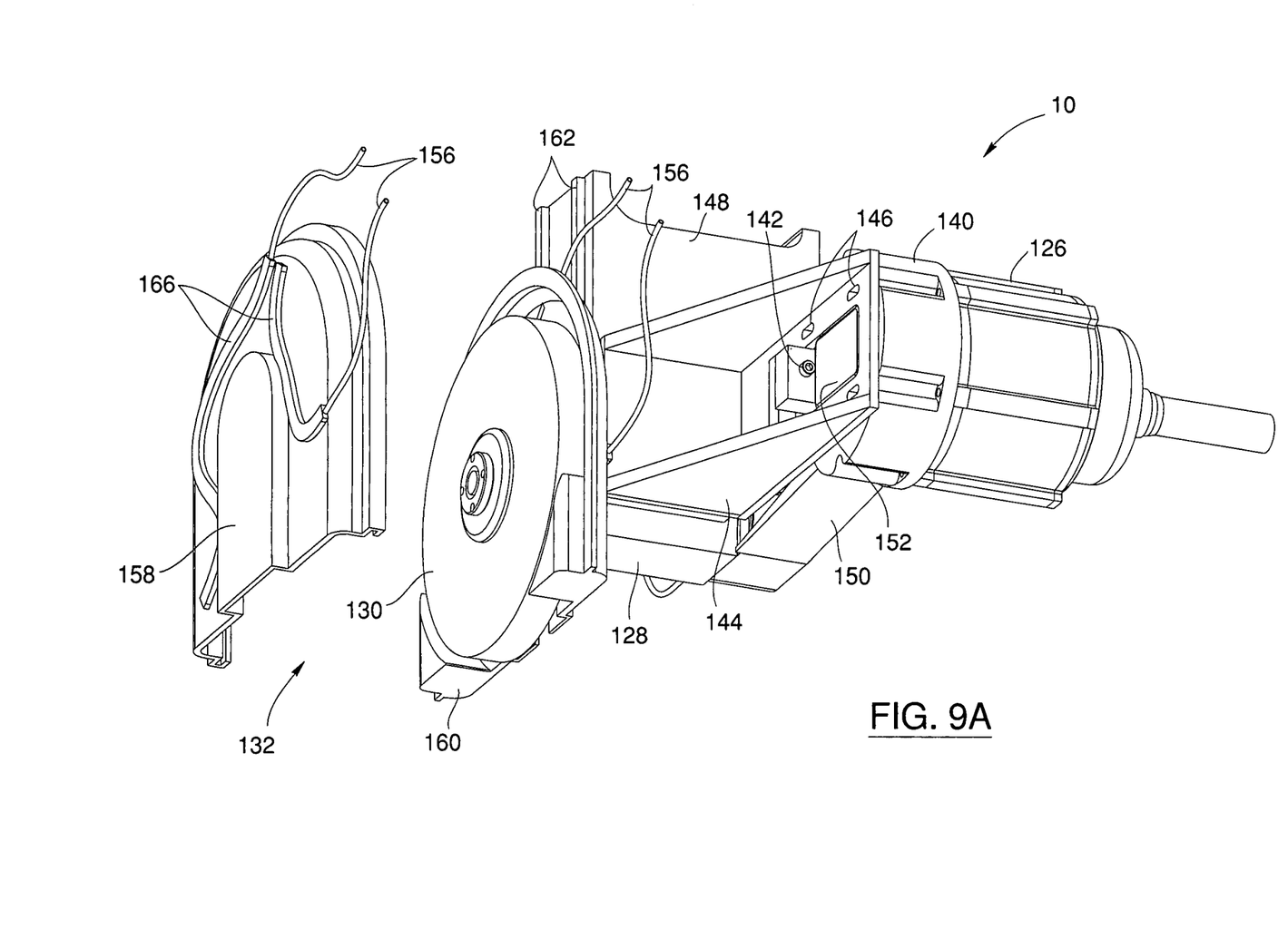
FIG. 9A is a front perspective schematic diagram of a machine tool of the robot, with its guard opened.
Figure 9B:
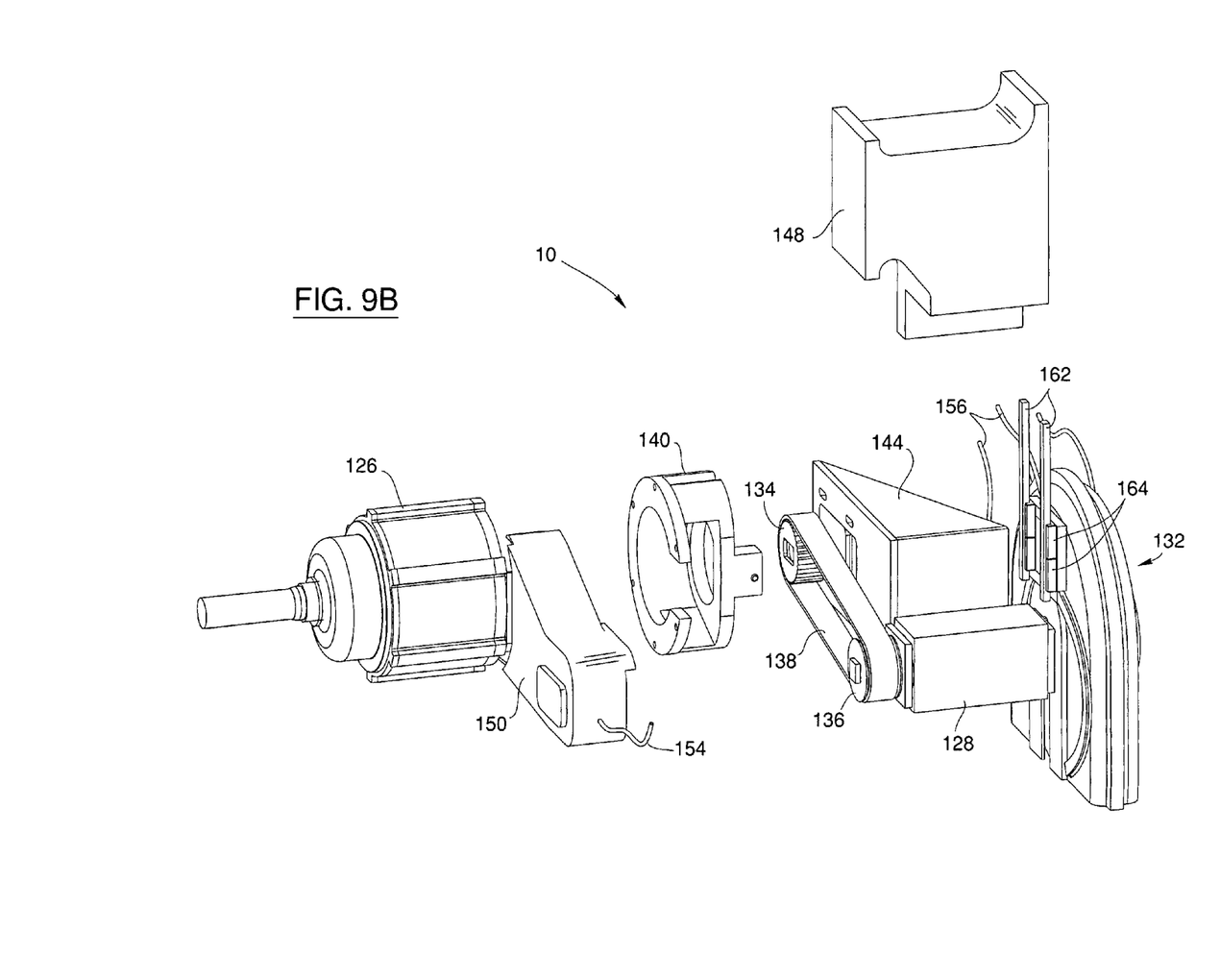
FIG. 9B is a rear perspective exploded schematic diagram of the machine tool.

Referring to FIGS. 9A and 9B, the grinding tool 10 has a submersible motor 126, a watertight transmission box 128, a grinding wheel 130 coupled to the motor 126 through the transmission box 128, a mobile guard 132 defining a chamber receiving a driven portion of the grinding wheel 130, as well as various support parts. The guard 132 has a lower opening through which a portion of the grinding wheel 130 extends. The grinding wheel 130 is the component that, once set in rotation, allows performing the reconditioning of a part by removal of material. The grinding wheel 130 is attached to the transmission box 128 (details shown in FIG. 10) that transmits the power of the submersible motor 126 to it through a grooved belt 138 coupling two grooved pulleys, namely a driving pulley 134 and a driven pulley 136.

The submersible motor 126 is attached to an adjustable support 140 that allows varying the tension of the grooved belt 138. For this purpose, a screw 142 allows exerting a pressure on the stationary support 144 when it is screwed in the adjustable support 140 and gets in contact with the stationary support 144. Slots 146 on the stationary support 144 allows the adjustable support 140 to slightly move and to exert a tension on the grooved belt 138 since the driving pulley 134, the submersible motor 126 and the adjustable support 140 are all attached together and thus move together. The stationary support 144 is attached to a main support 148, just like the transmission box 128.

The grinding tool 10 preferably exhibits characteristics in order to reduce the losses of power due, for example, to the rotation of the grooved pulleys 134, 136 and of the grinding wheel 130 as well as the movement of the grooved belt 138. The grooved pulleys 134, 136 and the grooved belt 138 are covered with a housing 150 and a lid 152 (which may be in plastic), and air (or another gas if desired) is injected around the pulleys 134, 136 and the belt 138 using a supply tube 154 connected to the housing 150 when the robot is in operation.

The same air injection principle is used for the grinding wheel 130 using the mobile guard 132 and supply tubes 156 communicating with the chamber defined by the guard 132. The guard 132 preferably has a removable component 158 and a fixed component 160 as well as a system of submersible tracks 162 and ball-bearing carriages 164 allowing it to move in the direction of the thrust guiding system 8. The removable component 158 allows easy access to the grinding wheel 130 to change it when maximum wear is reached. The removable component 158 may be removed and placed back on the fixed component 160 using screws or also be installable in a slide-like manner. The fixed component 160 is installed on two pairs of ball-bearing carriages 164 that slide along two parallel tracks 162. The two tracks 162 are attached to the main support 148 so that they are parallel to the tracks 100 of the thrust guiding system 8 (shown in FIG. 7). This arrangement of tracks 162 and ball-bearing carriages 164 allows the mobile guard 132 to passively draw back when it gets in contact with the surface of the part to be repaired (for example, the sill 14) and thus allows the grinding wheel 130 to remain in contact with the surface to be repaired even if its diameter decreases with wear. In operation, air is injected in the mobile guard 132 by the supply tubes 156 forming a gas supply for injecting the gas in the chamber defined by the guard 132 and thereby expelling at least a portion of the water in it in order to reduce the losses of power that would be due to the rotation of the grinding wheel 130 fully in water. In the illustrated case, two tubes 156 go to the removable component 158 and two tubes 156 go to the fixed component 160. The components 158, 160 have slots 166 allowing embedding the air supply tubes 156 that are pierced with a multitude of small holes along the slots 166 thereby forming air diffusing channels extending along the inner surface of the guard 132 in order to improve the air distribution around the grinding wheel 130 and in particular around its driven portion. Preferably, the guard 132 has an inner surface extending close to the grinding wheel 130, and the shape of which is adapted to the grinding wheel 130, so as to reduce the amount of air to be injected in the chamber.

It should be noted that the assembly of the tool 10 shown is adapted to a cylindrical type of grinding wheel. The position of the submersible motor 126, the choice of the power transmission elements, the direction of the rotation axis of the grinding wheel 130 and the inner shape of the guard 132, that preferably matches as closely as possible the geometry of the grinding wheel 130, are all function of the type of chosen grinding wheel or more generally, in the case where the machine tool used is different as in the case of a milling machine, of the type of the machining element of the tool in question.

Figure 10:
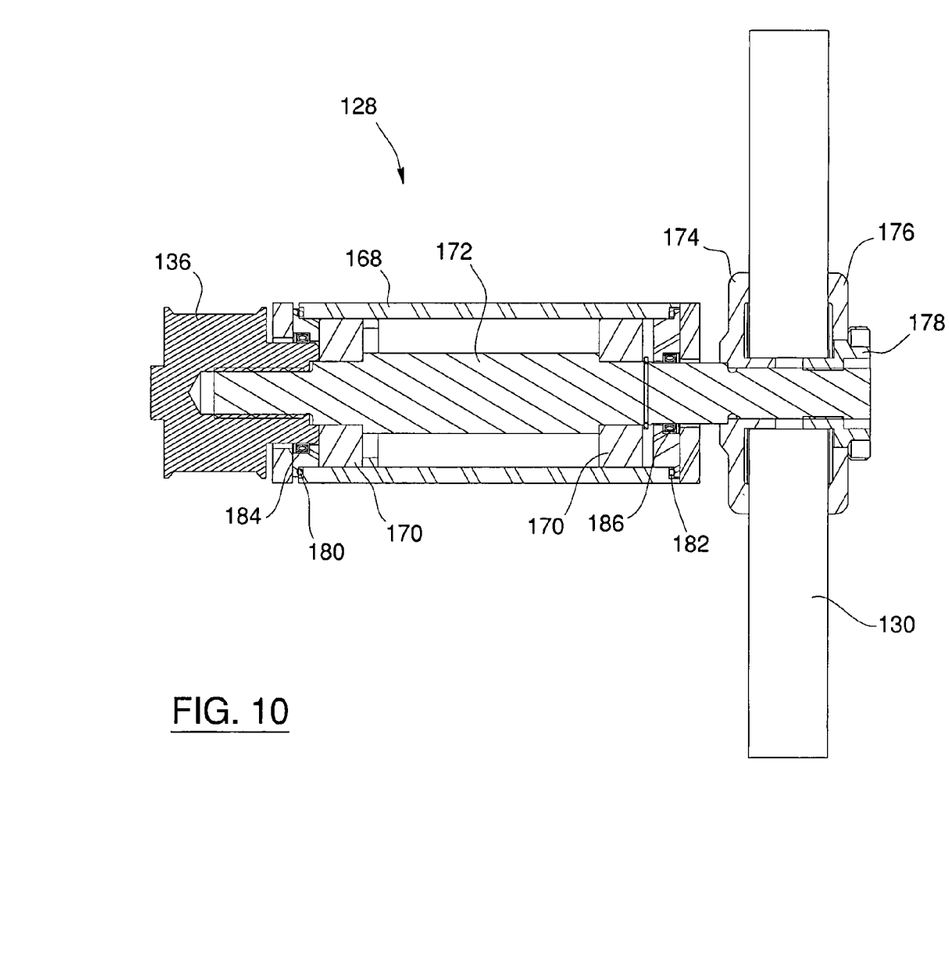
FIG. 10 is a cross-sectional schematic diagram of a transmission box of the machine tool.

Referring to FIG. 10, the transmission box 128 has a housing 168 in which are two ball bearings 170 that support a transmission shaft 172. The power is transmitted from the driven grooved pulley 136 to the grinding wheel 130 by the shaft 172. The grooved pulley 136 may be directly bolted on the shaft 172 while the grinding wheel 130 may be attached by two lateral tightening clamps 174, 176 to provide an appropriate support using a tightening part 178. The transmission box 128 is operative under water since two O-rings 180, 182 and two rotary seals 184, 186 prevent water from reaching the ball bearings 170. Furthermore, these ball bearings 170 can be specifically chosen to work properly on a temporary basis in case of breaking of the O-rings 180, 182 and/or the rotary seals 184, 186.

Figure 11:
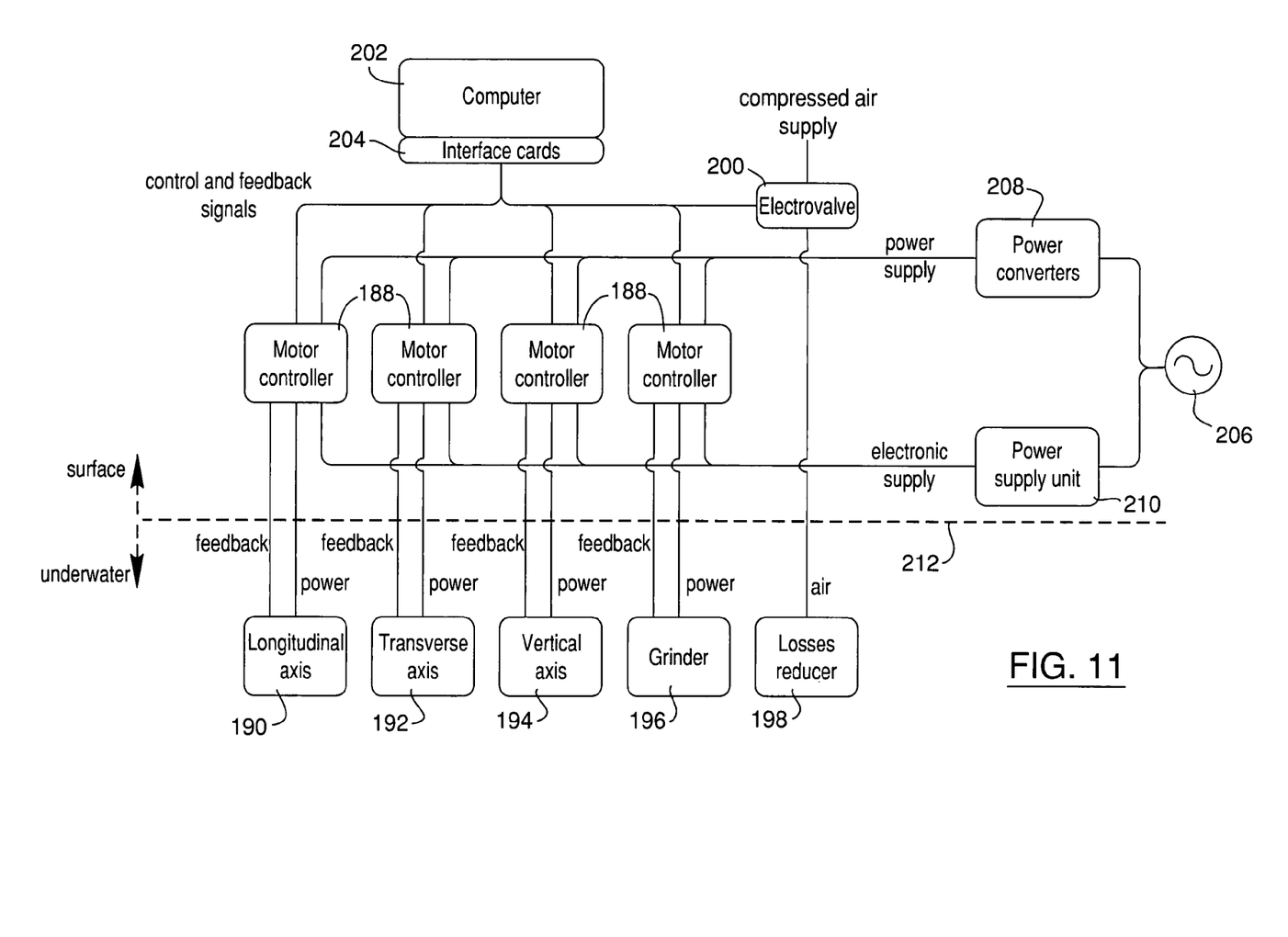
FIG. 11 is a schematic control diagram of the robot.

Referring to FIG. 11, there is shown a simplified schematic control diagram of the robot. The dashed line 212 draws the limit between what is at the surface (above) and under water (below). Blocks 190, 192, 194 represent the electromechanical components of the displacement units of the robot, like the motors 60, 82, 104 and the encoders 70, 88, 114 (shown in FIGS. 5, 6 and 7), used to move the mobile elements comprising the platforms 48, 78, 108 along the axes defined by the guiding elements comprising the tracks 54, 76, 100. Block 196 represents the electromechanical components of the machine tool 10, like its motor 126 (shown in FIGS. 9A and 9B) and its circuits (not shown). Block 198 represents the loss reducer device of the machine tool 10, like the guard 132, the housing 150 and the air supply tubes 154, 156 (shown in FIGS. 9A and 9B).

The control station 12 (shown in FIG. 1) has a programmable control unit for operating the displacement units and the machine tool 10 based on a closed-loop control mode in order to achieve the machining of the part. The control unit has a computer represented by block 202 provided with interface cards represented by block 204 connecting to the electromechanical components 190, 192, 194 of the displacement units and to the electromechanical components 196 of the machine tool 10 through motor controllers 188.

The motor controllers 188 have communication ports connecting to the interface cards 204, power supply inputs, power controllable outputs connecting to the electromechanical components 190, 192, 194, 196 of the displacement units and of the machine tool 10, electronic supply inputs, and feedback signal inputs connecting to the electromechanical components 190, 192, 194, 196 of the displacement units and of the machine tool. Power converters represented by block 208 have electric supply inputs, and power supply outputs connecting to the power supply inputs of the motor controllers 188. A power supply unit represented by block 210 has an electric supply input, and electronic supply outputs connected to the electronic supply inputs of the motor controllers 188. The air supply has a solenoid valve represented by block 200 having a gas supply inlet, a communication port connecting to one of the interface cards 204, and a controllable gas outlet connecting to the loss reducer device 198 of the machine tool 10. The electric supply inputs of the power converters 208 and of the power supply unit 210 connect to an alternating current source represented by block 206.

The electromechanical components 190, 192, 194, 196 are configured to receive power control signals from the motor controllers 188. The motor controllers 188 receive feedback signals from the electromechanical components 190, 192, 194, 196 in order to ensure the closed-loop control. The motor controllers 188 and the electromechanical components 190, 192, 194, 196 are thus connected in a bidirectional manner. The loss reducer device 198 is configured to receive the compressed air from the solenoid valve 200 located at the surface. The computer 202 forms a user interface for the robot and can control the solenoid valve 200 and the motor controllers 188 and obtain feedback from the motor controllers 188 using the interface cards 204 of the computer 202.

The computer 202 is configured to store a map of the surface of the part to be reconditioned, obtained beforehand for example using a 3D map system as disclosed in the published application WO2009/046519 (Miralles et al.). The computer 202 is also configured to receive and process the feedback signals, control the solenoid valve 200 and the motor controllers 188 based on the closed-loop control mode using the feedback signals, the map of the surface of the part to be machined, and programmable reconditioning parameters of the surface. The feedback signals may represent position information of the platform 48 with respect to the axis defined by the tracks 54, position information of the platforms 78, 108 with respect to the tracks 76, 100 and the current of the motors 82, 104 as well as the speed and current of the grinding wheel 10. The closed-loop control mode may in particular include a position control of the motors 60, 82, 104 with respect to the position information produced by the position encoders 70, 88, 114, and a control in speed and current (i.e. in power) of the submersible motor 126. An empirical model that estimates the removal rate of material as function of the operating parameters of the robot may be used to contribute to the precision of the reconditioning. The intervention of an operator may thus be limited to initiate execution of the tasks, oversee their execution, and step in if needed. The computer 202 may also be configured to operate the robot in manual or semiautomatic mode in order to achieve non-programmed particular tasks.

With the above described construction, the robot may be used in a water depth of at least 30 meters. The task-specialized mechanical structure ensures a rigidity supporting the grinding stresses when reconditioning steel structures or others. The number of degrees of liberty and the parts in motion is minimal in order to ensure the movements required by the machining task, and the rigidity of each part of the support and guiding structure is adapted to the stresses to which it is subjected. The positioning capacities of the robot, as a result of the precise measurement devices and the sufficient rigidity, coupled with the closed-loop control strategy, allow achieving the grinding task or another like machining in an automated way with precision. The loss reducer device allows eliminating most of the losses in power that would be caused by the rotation of the machining element of the tool 10 in a liquid environment. This aspect allows in particular reducing the power needed to operate the machine tool 10 and its size.

While embodiments of the invention have been illustrated in the accompanying drawings and described above, it will be evident to those skilled in the art that modifications may be made therein without departing from the invention. For example, the guiding modules 2, 4, 6 may be constructed differently, as long as their constructions are submersible, exhibit rigidities resisting to stresses produced by the grinding tool 10 and contributing to the precision of the displacements of the grinding tool 10, and provide an appropriate range of displacement and positioning of the grinding tool 10 with respect to the part 14 for a grinding task or another like machining. The displacement axes of the modules 4, 6, 8 may be linear, curved or otherwise, depending on whether the part to be machined has a planar, curved or other face. The motors 60, 82, 126 may be pneumatic or other instead of DC if desired, as long as they allow controlled positioning of the mobile elements. The extent of the space covered by the chamber of the machine tool may be reduced depending on the machining element used and the targeted power loss reduction rate. For example, in the case of a grinding wheel 130, the chamber may cover only partially the center sides of the grinding wheel 130, so that the chamber will be separated in two by the grinding wheel 130. The attachments 22 may have other configurations depending on the shape of the structural elements of the immerged structure, as long as they are capable of firmly fixing the support and guiding structure 2 with respect to the part to be machined. The construction of the control unit of the robot may include specific electronic and electrical circuits instead of a computer 202 if desired. Other types and configurations of devices capable of measuring the positions of the mobile elements with respect to the guiding elements may be used instead of the position encoders if desired. The robot may also be used to perform reconditioning works of an immerged structure in a sea port, a borehole, a bridge structure, and a ship hull.

The invention claimed is:

1. A robot for machining a part of structure under water, comprising:
    a machine tool having a submersible motor, a machining element coupled to the motor, a chamber receiving a driven portion of the machining element, and at least one gas inlet communicating with the chamber;
    a support and guiding structure for the machine tool, fixable with respect to the part to be machined and having submersible mobile elements and corresponding submersible guiding elements defining axes along which the mobile elements are movable for positioning the machine tool with respect to the part to be machined, the machine tool being attached to one of the mobile elements within reach of the part to be machined when the support and guiding structure is fixed with respect to the part to be machined, the mobile elements and the guiding elements having a rigidity resisting to stresses produced by the machine tool when the machine tool is in operation;

displacement units for displacement of the mobile elements along the axes;

a gas supply connectable to the at least one gas inlet of the machine tool for injecting gas in the chamber; and a control unit connecting to the machine tool and to the displacement units, the control unit being programmable for operating the displacement units and the machine tool based on a closed-loop control mode in order to perform the machining of the part.

2. The robot according to claim 1, wherein:

the structure has structural elements between which the part to be machined extends; and the support and guiding structure has a longitudinal axis in which one of the guiding elements called longitudinal guiding element extends, the robot further comprising attachments projecting at opposite ends of the longitudinal guiding element and operable to lock the support and guiding structure between the structural elements so that the longitudinal guiding element substantially extends in parallel to the part to be machined.

3. The robot according to claim 2, wherein the longitudinal guiding element comprises at least one longitudinal module having opposite ends configured to assemble with opposite ends of like modules used depending on whether a spacing between the structural elements requires more than one longitudinal module.

4. The robot according to claim 2, wherein each attachment comprises:

an arrangement of shoes, two of which project in opposite directions and are mobile between extended and retracted positions in which, respectively, the shoes engage against and disengage from the corresponding structural element;

articulated rods connected to the mobile shoes; and a jack coupled to the articulated rods and operable so that the articulated rods move the mobile shoes between the extended and retracted positions.

5. The robot according to claim 1, wherein the guiding elements called longitudinal, transverse and vertical guiding elements and the corresponding axes respectively extend in longitudinal, transverse and vertical directions of the support and guiding structure, one of the vertical and transverse guiding elements being attached to the mobile element corresponding to the longitudinal guiding element, and the other one of the vertical and transverse guiding elements being attached to the mobile element corresponding to said one of the vertical and transverse guiding element.

6. The robot according to claim 5, wherein:

the longitudinal guiding element comprises an elongated lattice having a triangulation contributing to its rigidity, and a pair of parallel tracks projecting along the elongated lattice, the corresponding mobile element comprising a platform slideably mounted on the tracks; and the displacement unit of the mobile element corresponding to the longitudinal guiding element comprises a submersible rotary motor having a pinion coupled to a rack extending in parallel to the longitudinal axis, the rack and the rotary motor being respectively mounted on one and the other one of the longitudinal guiding element and the corresponding mobile element.

7. The robot according to claim 5, wherein:

the transverse and vertical guiding elements comprise respective housings and respective pairs of parallel tracks projecting along the corresponding housings, the corresponding mobile elements comprising respective platforms slideably mounted on the corresponding pairs of tracks; and the displacement units for displacement of the mobile elements corresponding to the transverse and vertical guiding elements comprise submersible linear motors having respective magnetic shafts with permanent magnets extending in longitudinal directions of the respective housings, the motors and their magnetic shafts being respectively mounted on one and the other one of the mobile elements and the corresponding guiding elements.

8. The robot according to claim 5, wherein the displacement units comprise respective motors operationally coupled to the mobile elements and to the corresponding guiding elements to move the mobile elements along the axes in response to control signals generated by the control unit, and respective position encoders connecting to the control unit to produce position information of the mobile elements along the axes at the control unit, the closed-loop control mode comprising a control in position of the motors with respect to the position information produced by the position encoders.

9. The robot according to claim 8, wherein:

the machine tool is attached to the mobile element corresponding to the vertical guiding element; and the support and guiding structure further comprises an electrical box mounted on the vertical guiding element on a side opposite to the machine tool, the electrical box having watertight openings for receiving cables connecting the motors and the position encoders to the control unit.

10. The robot according to claim 1, wherein:

the machining element comprises a grinding wheel;

the machine tool comprises a guard defining the chamber, the guard having a lower opening through which a portion of the perimeter of the grinding wheel extends, and an inner surface extending close to the grinding wheel and having a shape adapted to the grinding wheel; and the machine tool comprises a transmission coupling the grinding wheel to the motor, and an arrangement slideably supporting the guard with respect to the grinding wheel so that the guard draws back as the grinding wheel wears off.

11. The robot according to claim 10, wherein:

the transmission comprises an adjustable transmission unit disposed in a housing defining an inner space;

the machine tool comprises at least one extra gas inlet communicating with the inner space of the housing; and the gas supply also connects to the at least one extra gas inlet to inject gas in the housing.

12. The robot according to claim 10, wherein the at least one gas inlet comprises a gas diffusing channel extending along the inner surface of the guard.

13. The robot according to claim 1, wherein:

the control unit comprises:

a computer;

interface cards connecting to the computer;

controllers having communication ports connecting to the interface cards, power supply inputs, controllable power outputs connecting to the displacement units and to the machine tool, electronic supply inputs, and feedback signal inputs connecting to the displacement units and to the machine tool;

power converters having electric supply inputs, and power supply outputs connecting to the power supply inputs of the controllers; and a power supply unit having an electric supply input, and electronic supply outputs connecting to the electronic supply inputs of the controllers; and the gas supply comprises a solenoid valve having a gas supply inlet, a communication port connecting to one of the interface cards, and a controllable gas outlet connecting to the machine tool.

14. The robot according to claim 13, wherein the computer is configured to store a map of the surface of the part to be machined, receive and process the feedback signals, and control the solenoid valve and the controllers based on the closed-loop control mode using the feedback signals, the map of the surface of the part to be machined, and programmable reconditioning parameters of the surface of the part to be machined.

15. The robot according to claim 13, wherein the feedback signals comprise position signals of the mobile elements with respect to the corresponding guiding elements, current signals of the displacement units, and speed and current signals of the machine tool.

16. The robot according to claim 1, wherein the part of structure to be machined comprises a runway, a sill or a lintel of a sluice.

17. A method for machining a part of structure under water with a machine tool having a submersible motor and a machining element coupled to the motor, comprising the steps of:

fixing a support and guiding structure for the machine tool with respect to the part to be machined, the support and guiding structure having submersible mobile elements and corresponding submersible guiding elements defining axes along which the mobile elements are movable, and displacement units for displacement of the mobile elements along the axes for positioning the machine tool with respect to the part to be machined, the machine tool being attached to one of the mobile elements within reach of the part to be machined when the support and guiding structure is fixed with respect to the part to be machined, the mobile elements and the guiding elements having a rigidity resisting to stresses produced by the machine tool when the machine tool is in operation;

providing the machine tool with a chamber receiving a driven portion of the machining element, and at least one gas inlet communicating with the chamber;

supplying the at least one gas inlet of the machine tool with gas for injecting gas in the chamber; and operating the displacement units and the machine tool based on a closed-loop control mode in order to perform the machining of the part.

* * * * *